United States Patent [19]

Brighty

[11] 4,369,583

[45] Jan. 25, 1983

[54] PLOTTING DEVICE

[76] Inventor: Sidney G. Brighty, Nova Guest House, 76 Nova Rd., West Croydon, Surrey, England

[21] Appl. No.: 338,193

[22] Filed: Jan. 8, 1982

Related U.S. Application Data

[63] Continuation of Ser. No. 83,780, Oct. 11, 1979, abandoned.

[51] Int. Cl.³ .............................................. B43L 7/00
[52] U.S. Cl. ...................................... 33/403; 33/424
[58] Field of Search ............... 33/1 D, 1 N, 26, 27 R, 33/27 C, 27 D, 403, 418, 422–426, 431, 465, 471, 497–500

[56] References Cited

U.S. PATENT DOCUMENTS

| | | | |
|---|---|---|---|
| 977,048 | 11/1910 | Smith | 33/431 |
| 1,809,058 | 6/1931 | Miner et al. | 33/495 |
| 2,345,367 | 3/1944 | Thorne | 33/26 |
| 3,241,240 | 3/1966 | Boehm | 33/26 |
| 4,175,330 | 11/1979 | Hermann | 33/27 C |

FOREIGN PATENT DOCUMENTS

| | | | |
|---|---|---|---|
| 99505 | 10/1898 | Fed. Rep. of Germany | 33/424 |
| 573681 | 11/1945 | United Kingdom | 33/497 |

*Primary Examiner*—Charles E. Phillips
*Attorney, Agent, or Firm*—John J. Byrne

[57] ABSTRACT

A device for plotting points on a drawing surface comprises a number of separate parts which are assembled on the drawing surface to produce a drawing instrument which covers a required angular range. The parts include a pivot boss which may be taped to the surface with its cross-wire over a given reference center, a radius arm which is pivotally mountable on the boss, and a plurality of interlocking protractor segments having an angular scale. The radius arm has a detachable radial distance scale, a vernier angular scale, and also a small hole for plotting positioning arcs on the surface. The protractor segments are separately attachable to the surface and may be positioned with respect to the center by means of the said positioning arcs. In an alternative embodiment the radius arm comprises a radial distance scale member with a pivot member clamped to one end and a vernier angular scale clamped to the other end.

8 Claims, 6 Drawing Figures

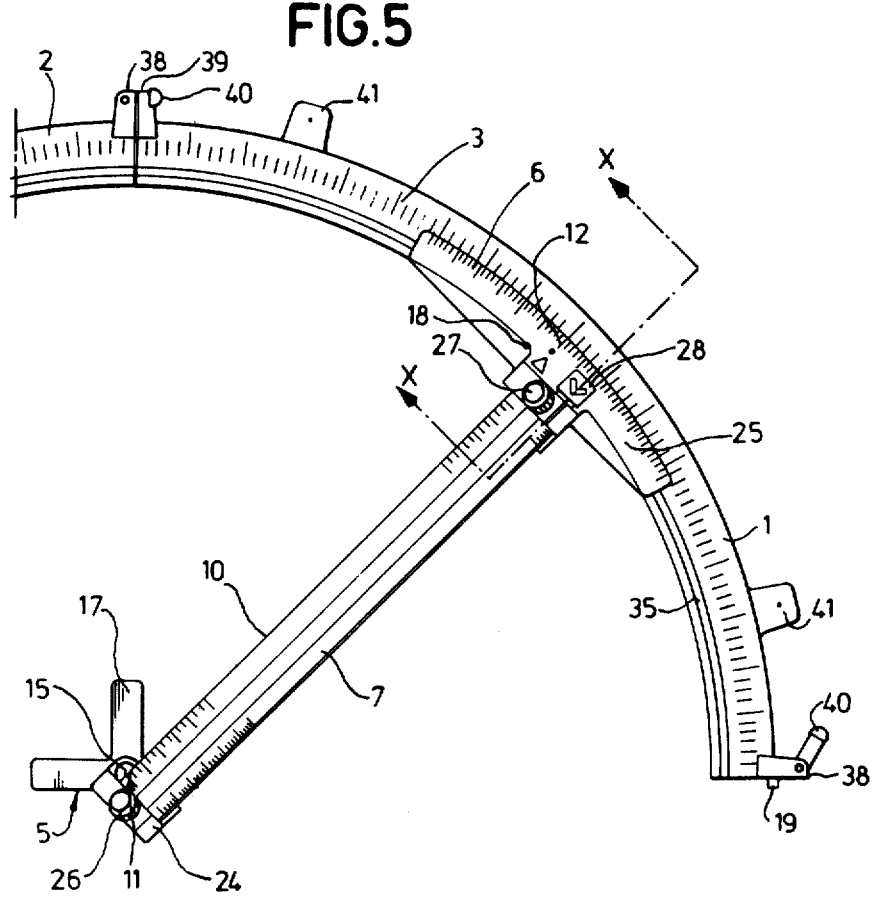
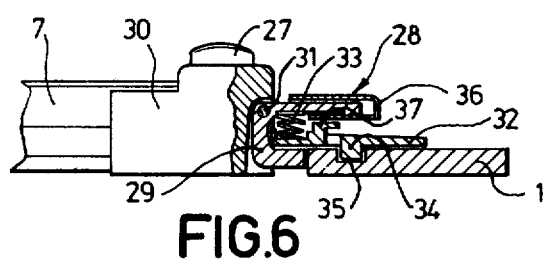

PLOTTING DEVICE

This is a continuation of application Ser. No. 06/083,780, filed Oct. 11, 1979, now abandoned.

BACKGROUND OF THE INVENTION

This invention relates to a device for plotting points having a given angular and distance relationship with a reference point.

Tachymetry is a technique used in surveying whereby measurements of the bearing and distance of a remote point relative to a survey station are carried out optically by a single instrument. This technique is becoming increasingly common and more accurate due to the availability of electronic distance measuring instruments capable of measuring distances to a hitherto unobtainable accuracy. Thus there is a requirement for an inexpensive plotting device for use on the drawing board which is capable of plotting simultaneously distances and angles obtained from tachymetric measurements, the angular accuracy being better than the normal half or quarter of a degree obtainable from a simple circular protractor.

There are some known plotters available, covering a full 360 degree range, but these are relatively expensive and generally used in conjunction with telemetering instuments. They are therefore only used by organisations in which tachymetric methods of surveying are in constant use.

Another known device is a simple plotting protractor in the form of a printed card with a circular opening of about 500 mm diameter and angular graduations around the circumference of the opening. The protractor is placed on the drawing surface and points plotted within the circular opening. Some care is needed in positioning the opening centrally with respect to the reference point since the protractor itself has no physical central mark. No radial distance scale is provided and accuracy generally does not exceed ¼ degree of arc.

SUMMARY OF THE INVENTION

It is an object of this invention to provide a relatively inexpensive and simple plotting device having both distance and angle scales which is capable of plotting to an angular accuracy better than ¼ degree of arc.

According to this invention a plotting device for plotting points on a drawing surface comprises:

(a) a radius arm having means in the region of one of its ends for attaching the arm to the surface so as to allow rotation of the arm relative to the surface about a chosen center, the arm having in the region of its other end an angular vernier scale, and between the ends a longitudinal distance scale; and (b) a protractor in the form of a ring or ring portion and having a main angular scale, the protractor being a separate component which is individually and separately attachable to the surface relative to the said center in such a manner that the radius arm extends between the center and the protractor with the vernier scale coacting with the main angular scale to enable setting of the angle of the radius arm relative to the protractor. The device may, in accordance with the invention, be assembled from a set of parts including at least one but not more than four protractor segments, and a radius arm.

The angular accuracy of the device depends upon the size of the protractor. With an inner radius of approximately 300 mm plotting can be carried out to the nearest minute of arc using the vernier scale. This size of protractor also enables a standard 300 mm scale to be used on the radius arm. However, greater angular accuracy can be obtained if a larger protractor is used.

A preferred embodiment of the device is in the form of a set of parts with the protractor divided into interlocking quadrants, enabling the user to assemble a plotting device covering a 90, 180, 270 or a full 360 degrees range. A set of parts also has the advantage of being compact for the purposes of packaging and storage. The device does not include any member linking the radius arm pivot to the protractor. It is only when the device has been assembled on the drawing surface that the radius arm pivot is rigidly fixed with respect to the protractor, the rigid connection being the drawing surface itself. This absence of linking members minimises the size of the 'dead' area of the drawing surface, i.e. the area which is masked by the device and which is therefore not available for plotting points.

DESCRIPTION OF PREFERRED EMBODIMENTS

Figure 1:
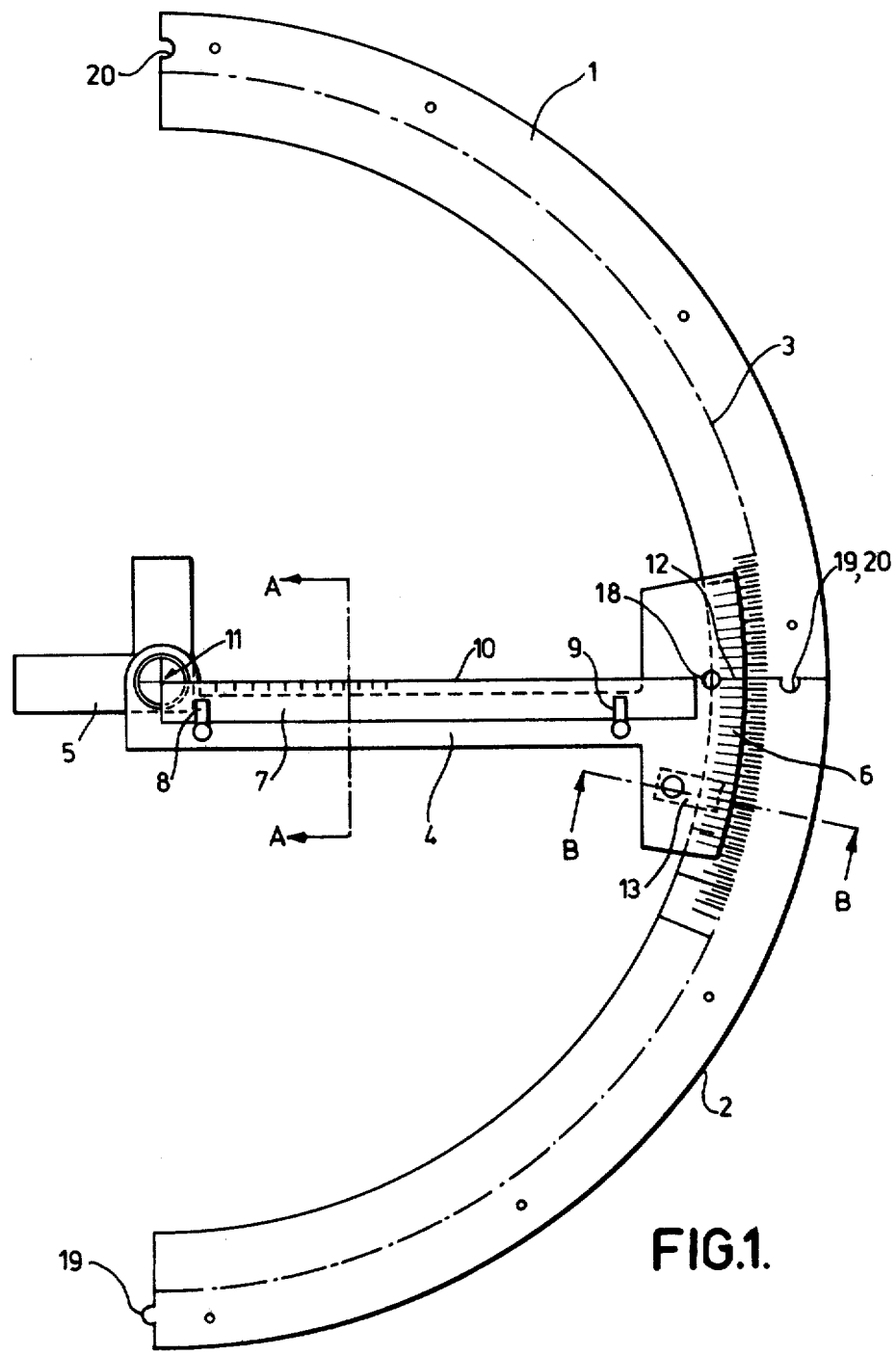
Figure 2:
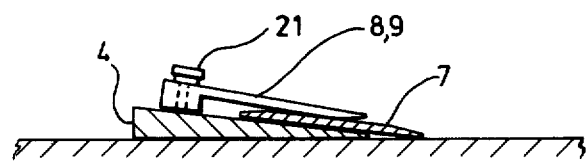
Figure 3:
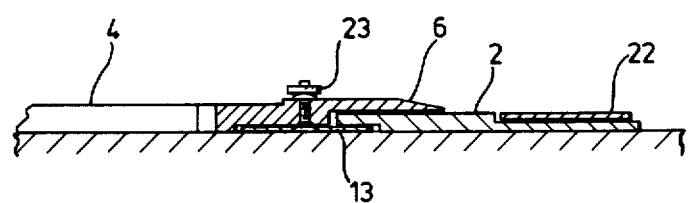
Figure 4:
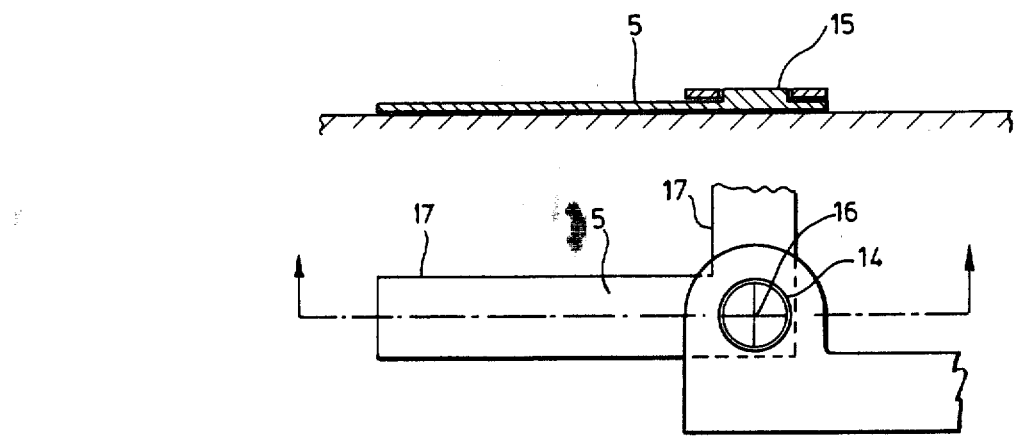

The invention will now be described by way of example and with reference to the drawings, in which:

FIG. 1 is a plan of an assembled plotting device;
FIG. 2 is a section in the plane A—A;
FIG. 3 is a section in the plane B—B;
FIG. 4 is a plan and a section of the radius arm pivot;
FIG. 5 is a plan of an alternative plotting device; and
FIG. 6 is a partly sectioned side elevation along the line X—X in FIG. 5.

Referring firstly to FIG. 1, an assembled 180° plotting device has two protractor quadrants 1 and 2 with a main angular scale 3. A radius arm 4 is rotatable about a center pivot formed by a plotting boss member 5 and carries a vernier angular scale 6. The latter rests on and is slidable over the main angular scale 3. A distance scale 7 is held in position on the radius arm 4 by two adjustable clamps 8 and 9 with its edge 10 coincident with a line joining the pivoting center 11 of the boss member and the zero mark 12 on the vernier scale. The angular position of the radius arm 4 can be locked by tightening a screw 23 (FIG. 3) of an adjustable clamp 13 which grips the underside of the protractor. The protractor quadrants, the radius arm and vernier scale are preferably all made of transparent plastics material with the scale, numerals, center mark and other markings printed directly onto the plastics surface. The main angular scale may be made up of separate parts which are attached to the quadrants by rivets.

When it is required to plot points on a drawing, the device is assembled as follows.

Firstly the boss member 5 is placed on the drawing surface with its center 11 over a given reference point or station. The member 5 is shown in greater detail in FIG. 4. The radius arm 4 has a circular hole 14 which fits on the raised boss 15. (Alternatively, the hole 14 may be relatively small so that it fits over a hardened steel pivoting pin projecting vertically from the center of the boss 15). A cross-wire 16 is printed on the underside of the plotting member 5 and, since the boss center is transparent, it is a simple operation to position the cross over a point marked on the drawing surface beneath. The member 5 is then fixed to the drawing surface with self-adhesive drafting tape across the thin steel tabs 17. (A plotting boss of this form rather than one which has members connecting the boss to the protractor has the advantage of occupying less space in the drawing area, i.e. it has a smaller "dead area").

The radius arm 4 is fitted to the member 5 and, using a pencil with its point in a small hole 18 in the arm adjacent the zero mark 12 of the vernier scale, short arcs are drawn at intervals around a 180 degree arc. The distance of the small hole 18 from the center 11 is equal to the inner radius of the quadrants 1 and 2. Thus, the short arcs act as positioning marks for the quadrants which can then be taped or pinned in place on the drawing surface, their angular position being determined from a given reference line on the drawing. To assist in the positioning of the quadrants relative to each other, interlocking lugs 19 and sockets 20 are provided at their ends.

The distance scale 7 is placed on the radius arm 4 with its edge 10 in line with the center 11 and the vernier zero mark 12 and the screws 21 are tightened to clamp it in position, as shown in FIG. 2.

The final stage of assembly is to fit a scale numerals segment 22 to the protractor, as shown in FIG. 3. (This component is not shown in FIG. 1). The numerals segment 22 is made of a transparent plastics material and has scale numerals printed on it which match the scale markings of the main angular scale on the quadrants. The segment 22 is movable circumferentially on the protractor, enabling the user to shift, if necessary, the reference angle by multiples of, for example, five or ten degrees. In an alternative embodiment, scale numerals segments 22 are not provided. Instead, the protractor quadrants are made of such a material with their upper surfaces of such a texture that numerals can be written directly on the protractor adjacent the scale 3, with for example a pencil.

Plotting of a point is carried out by moving the radius arm to the required angle using the angular scales, if necessary locking it in that position by tightening the clamp 13 with the screw 23, and then marking the point on the drawing at the edge 10 at the required distance from the center 11 as indicated by the markings on the distance scale 7. In the case where the main angular scale 3 is printed or embossed directly on the upper surface of the protractor quadrants 1 and 2, the angular position of the protractor on the drawing surface may be altered by tightening the clamp 13, removing the tape or pins attaching the quadrants to the drawing surface, and then pivoting the whole assembly of radius arm 4 and quadrants 1 and 2 about the center 11.

An alternative embodiment of the invention is shown in FIGS. 5 and 6, which have reference numerals corresponding to those of the previous figures. This embodiment has a radius arm formed by a distance scale member 7, to which an inner end portion 24 and an outer end portion 25 are clamped by screw clamps 26 and 27. The inner end portion 24 is a plastics component having a circular aperture which corresponds in diameter to the raised boss 15 of the member 5 for rotation of the radius arm about the center 11. The portion 24 may, if required, be a snap fit over the boss 15. The outer end portion 25 has a printed or embossed vernier angular scale 6 and locking means including tab 28 for locking the radius arm in position on the protractor.

The locking means is shown in section in FIG. 6 and includes a hinged U-shaped arm 29 attached to the body 30 of the outer end portion by a shaft 31. The part 32 (integral with the body 30) of the outer end portion bearing the vernier scale has a depression which houses the lower end of a coil spring 33, the latter biasing the arm 29 in an anti-clockwise direction about the shaft 31. The part 32 also has a downwardly projecting ridge 34 seated in a groove 35 in the protractor quadrant 1, and it will be seen that the biasing effect of the spring 33 causes the left hand portion of the quadrant 1 to be clamped between the ridge 34 and the lower end of the arm 29, with the ridge 34 gripping the inner wall of the groove 35. The tab 28 of the arm 29 is provided with a sleeve 36 which is slidable towards or away from the shaft 31 so that, if a downward pressure is applied on the tab 28 to compress the spring 33, the sleeve may be moved to the left to trap the hook portion 37 of the part 32, thus holding the locking means in the open position when the downward pressure is removed.

Further features of the embodiment of FIGS. 5 and 6 include:

(i) an arrangement for attaching the protractor quadrants to each other, whereby each quadrant has a first interlocking part 38 at one end and a corresponding second interlocking part 39 at its other end, the part 38 having a hinged catch 40 for engaging a slot in the part 39;

(ii) fixing tabs 41, allowing the quadrants to be taped or pinned to the drawing surface; and (iii) a small hole 18 in the outer end portion 25 for plotting protractor positioning arcs as described above.

It has been found that, with the vernier scale 6 suitably graduated, the radius arm can be set to within one minute of the chosen angle. In order to match this angular accuracy with a comparable accuracy in the radial direction a further feature of the device may be incorporated in accordance with the invention. This is the provision of a vernier distance scale (not shown) on the radius arm. This may be in the form of a short scale which is slidable along the length of the radius arm and which extends to the edge 10 of the distance scale 7. Alternatively, the main distance scale 7 may be adjustably mounted on the arm with the degree of adjustment being indicated by a pair of coacting short scales, one on the radius arm and one on the main scale 7.

What is claimed is:

1. A plotting device for plotting points on a drawing surface comprising:
   (a) a central island member adapted for mounting on said drawing surface over a pre-selected point,
   (b) a peripheral protractor having an arcuate inner edge defining at least part of a circle and adapted to be mounted on said drawing surface at a selected position with respect to said island member so that said island member is the center of said circle, said protractor having an angular scale thereon,
   (c) a radius arm having an inner end and an outer end,
   (d) means operably connected to an outer end of said radial arm for locating said selected position,
   (e) second means removably and pivotally securing said inner end to said island member,
   (f) a vernier angular scale at the outer end of said arm coacting with said angular scale, and
   (g) a longitudinal distance scale on said arm between said inner end and said outer end.

2. A plotting device according to claim 1 wherein said means to locate is a positioning recess formed in said radius arm at a distance from the center of said island member equal to the radius of said circle.

3. A plotting device according to claim 1, wherein said protractor comprises a plurality of protractor segments, each of said segments being in the form of part of a ring and means for locking neighboring segments in an end-to-end relationship.

4. A plotting device according to claim 3, wherein each of said protractor segments is subtended by an angle of 90° at the center of said circle.

5. A plotting device according to claim 1, wherein said central island member has a maximum dimension less than said radius of said circle.

6. A plotting device according to claim 1 wherein:
(a) said central island member comprises:
(i) a circular-boss and
(ii) one or more fixing tabs for mounting said pivot island member on the drawing surface at the center of the circle and
(b) said radius arm has a circular aperture in its inner portion for receiving said boss so that said radius arm is pivotable relative to said boss.

7. A plotting device according to claim 1 further comprising third means for detachably mounting said distance scale to said arm.

8. A plotting device according to claim 1 and further comprising:
means for selectively clamping said radius arm to said peripheral protractor.

* * * * *